US011663503B2

(12) United States Patent
Pan et al.

(10) Patent No.: US 11,663,503 B2
(45) Date of Patent: May 30, 2023

(54) ENHANCED BOTTLENECK ANALYSIS AT AN EARLY STAGE IN A MICROSERVICE SYSTEM

(71) Applicant: International Business Machines Corporation, Armonk, NY (US)

(72) Inventors: Tian Ming Pan, Beijing (CN); Bo Chen Zhu, Xi'an (CN); Peng Fei Tian, Beijing (CN); Chu Yun Tong, Beijing (CN); Dan Hui Fan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 16/561,164

(22) Filed: Sep. 5, 2019

(65) Prior Publication Data
US 2021/0073656 A1    Mar. 11, 2021

(51) Int. Cl.
| | | |
|---|---|---|
| *G06Q 30/00* | (2023.01) | |
| *G06N 5/04* | (2023.01) | |
| *G06N 20/00* | (2019.01) | |
| *G06Q 40/02* | (2023.01) | |

(52) U.S. Cl.
CPC .............. *G06N 5/04* (2013.01); *G06N 20/00* (2019.01); *G06Q 40/02* (2013.01)

(58) Field of Classification Search
CPC ........................................................ G06N 5/04
USPC ...... 706/12, 1.1, 45; 705/1.1, 39, 44, 24, 75; 711/162; 345/582, 592
See application file for complete search history.

(56) References Cited

U.S. PATENT DOCUMENTS

| | | | |
|---|---|---|---|
| 9,323,652 B2 | 4/2016 | Garrett et al. | |
| 10,230,600 B2 | 3/2019 | Bhasin et al. | |
| 2009/0177642 A1 | 7/2009 | Chung et al. | |
| 2014/0013311 A1* | 1/2014 | Garrett | G06F 11/3688 |
| | | | 717/128 |
| 2016/0314064 A1* | 10/2016 | Moretto | H04L 43/091 |
| 2019/0108004 A1 | 4/2019 | Kavanagh et al. | |

OTHER PUBLICATIONS

ProQuestDialogNPL Search History.*
Ibidunmoye, O. et al., "Performance Anomaly Detection and Bottleneck Identification*", Jul. 3, 2015, ACM Computing Survey, vol. 48, Issue 1, pp. 1-37.

* cited by examiner

*Primary Examiner* — John H. Holly
(74) *Attorney, Agent, or Firm* — Cantor Colburn LLP; Teddi Maranzano (57) ABSTRACT

Aspects of the invention include a computer-implemented method by executing, via a processor, a bottleneck model training process for microservices in a microservice system, wherein for each of the microservices the bottleneck model training process filters out a subset of training data based at least in part on a current situation setting. Building, via the processor, a bottleneck indicator model for each of the microservices using information from the bottleneck model training process, convergence points for an expected response time. Executing, via the processor, a bottleneck identification process for providing system alerts when a bottleneck is identified, wherein the bottleneck identification process uses analysis to monitor a data stream according to the bottleneck indicator model which uses the convergence points for response times.

19 Claims, 9 Drawing Sheets

ENHANCED BOTTLENECK ANALYSIS AT AN EARLY STAGE IN A MICROSERVICE SYSTEM

BACKGROUND

The present invention generally relates to detecting bottlenecks in data services, and more specifically, to conducting bottleneck analysis at an early stage in a microservice system.

In contemporary systems, bottleneck analysis includes collecting information about system resources and response times for running transactions and then generating alerts or events based on defined thresholds. The collected data is analyzed to find one or more possible bottleneck locations. It is often very difficult for a user to identify the root cause of a bottleneck using contemporary approaches because microservice transactions are not running as standalone transactions and often have interdependencies.

SUMMARY

Embodiments of the present invention are directed to conducting enhanced bottleneck analysis at an early stage in a microservice system. A computer-implemented method a computer-implemented method by executing, via a processor, a bottleneck model training process for microservices in a microservice system, wherein for each of the microservices the bottleneck model training process filters out a subset of training data based at least in part on a current situation setting. Building, via the processor, a bottleneck indicator model for each of the microservices using information from the bottleneck model training process, convergence points for an expected response time. Executing, via the processor, a bottleneck identification process for providing system alerts when a bottleneck is identified, wherein the bottleneck identification process uses analysis to monitor a data stream according to the bottleneck indicator model which uses the convergence points for response times.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention perform response time analysis to enhance bottleneck detection in a microservice system by providing bottleneck alerts in an early stage before the system health is impacted. A model is built for each microservice within the microservice system, in which there are separated several subservices. Then a check of the monitor stream data with the model can be done. If there are minor changes in the response time this indicates a potential bottleneck which can be identified and an alert generated.

In contrast to monolithic services, a microservice system puts each functional element into a separate service. This separate service, or microservice, contains only the functional and database elements necessary to perform the particular function. Microservices can be combined into a microservice chain that combines multiple microservices when multiple functions are required. Each microservice may operate as a black box, providing distinct functionality that is exposed to other microservices by a strictly defined interface. A microservice may contain many transactions and may be divided into subservices. In one or more embodiments of the present invention, the transactions include financial service industry transactions. For example, in banking systems, saving account transactions are part of a microservice which can be triggered by counter, mobile, or ATM actions. Different accounts will have different levels of importance, e.g. whether this account belongs to a certain bank organization.

One or more embodiments of the present invention works well with weather reporting where a country's weather reporting is a microservice. A microservice may contain many transactions and may be divided into subservices. The subservices in this example are global weather reporting. In weather reporting system, each weather bureau will have its own weather collector and data analysis system. When collecting weather information and conducting data analysis from different countries, states and cities are queried is the same microservice.

Figure 1:
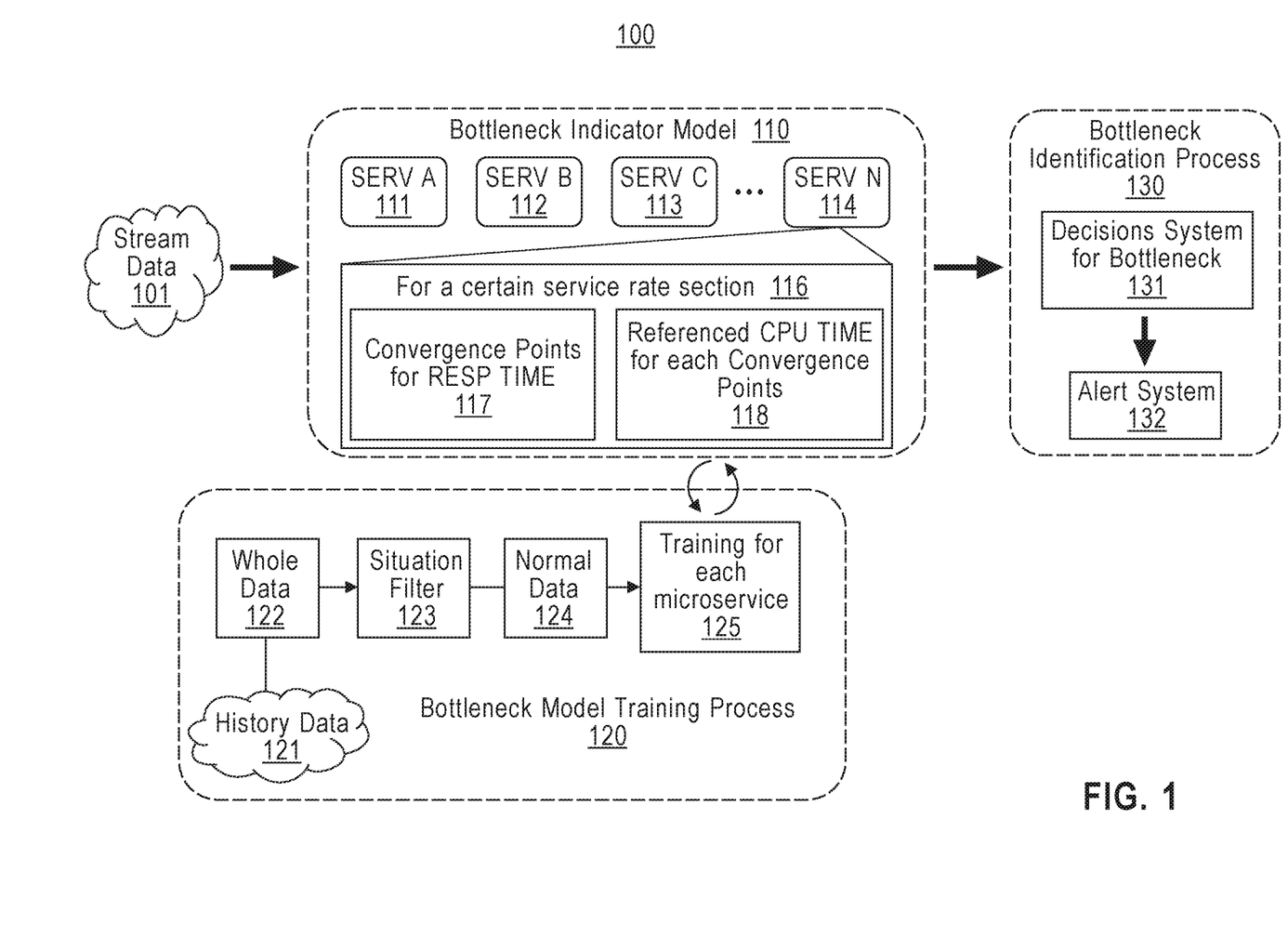
FIG. 1 illustrates a flow diagram of a process for enhanced bottleneck analysis in an early stage in a microservice system in accordance with one or more embodiments of the present invention.

Turning now to FIG. 1, a flow diagram of an overall process 100 for enhanced bottleneck analysis in an early stage in a microservice is generally shown in accordance with one or more embodiments of the present invention. The process includes three main parts: a bottleneck model training process 120, a bottleneck indicator model 110, and a bottleneck identification process 130. Bottleneck model training process 120 is used for building the bottleneck indicator model 110 by doing analysis of the historical data 121 and supplying whole data 122. Whole data 122 includes any and all data which has been transmitted or received. For each microservice service, a situation filter 123 filters out some data by using a current situation setting. For example, the microservices the bottleneck model training process filters out a subset of training data based at least in part on a current situation setting in which a response time for a microservice is greater than expected. Accordingly, the microservice should be considered as having an abnormal service level. In this case, this piece of record should not be included in the training because it will affect the accuracy of the model which is used to identify the normal status. Once filtered, normal data 124 is used for training each microservice 125 within the bottleneck indicator model 110.

The bottleneck indicator model 110 receives a data stream 101. The data stream 101 is supplied to several microservice (SERV A, 111), (SERV B, 112), (SERV C, 113), and (SERV N, 114). For each of the microservices there is a service rate section. One such example service rate section 116 is for the microservice SERV N, 114. Within service rate section 116, a table will contain convergence points for response time in different service rate in block 117. The detailed development for convergence points is described hereafter. Each service rate section 116 also contains a block 118 which uses a distribution for the convergence points to develop an average CPU time for the service within each convergence points. The bottleneck identification process 130 receives the output of the bottleneck indicator model 110. Within the bottleneck identification process 130 is a decision system for bottleneck 131. Based on the decision system 131, if an alert needs issued an alert system 132 provides the alert. More details of the decision system for bottleneck 131 is described hereafter.

Figure 2:
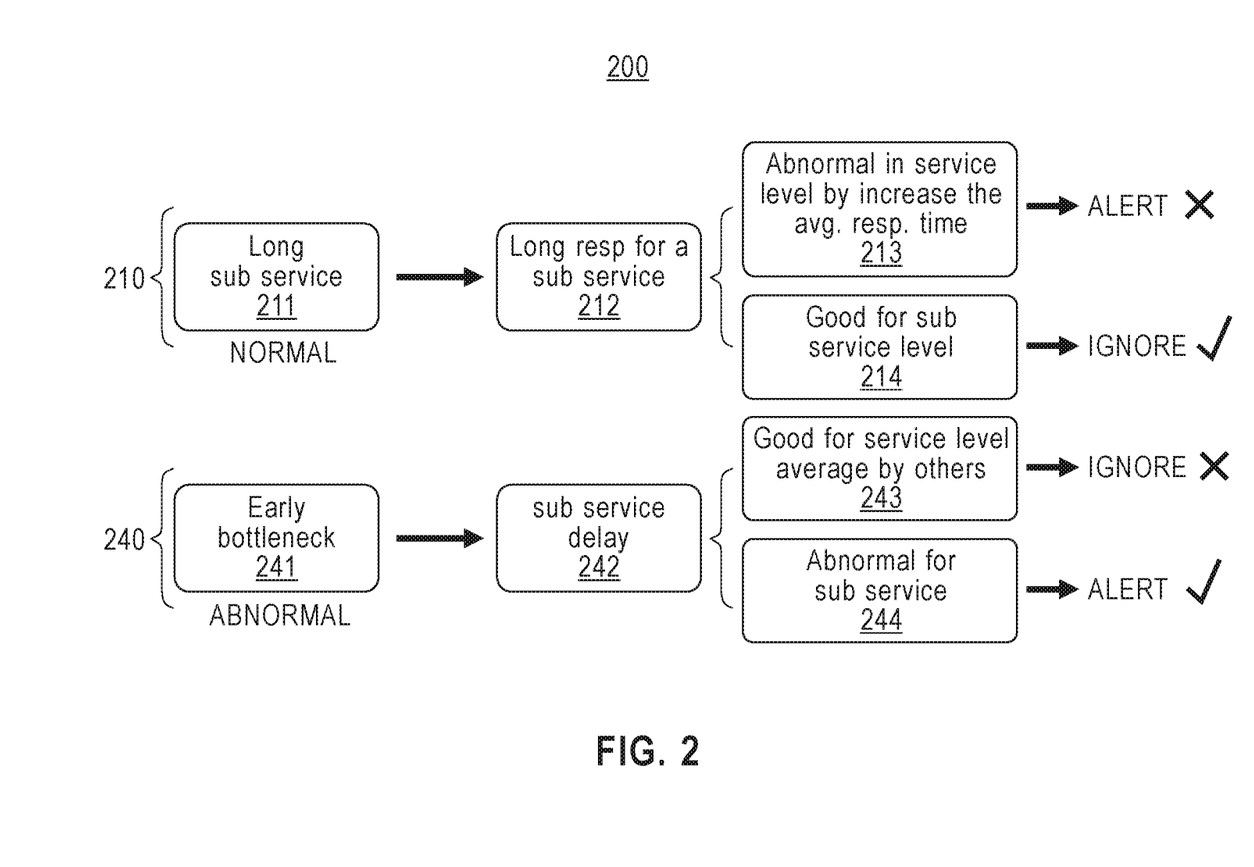
FIG. 2 illustrates a methodology of a process for enhanced bottleneck analysis in an early stage in a microservice system in accordance with one or more embodiments of the present invention.

Referring to FIG. 2, a methodology 200 is generally shown in accordance with one or more embodiments of the present invention. The methodology 200 looks at a long subservice action path 210 as part of a microservice along a normal path. The methodology 200 further looks at an early bottleneck action path 240 within a subservice as part of a microservice. Within a normal long subservice 211, the system looks for a long response 212 for the subservice. When the response time is good for that subservice level, as shown in block 214, any possible bottleneck warning is ignored. If an abnormal service level has an increase in the average response time, as shown by block 213, then an alert is issued for the subservice. Within the early bottleneck action path 240, any early bottleneck 241 is considered abnormal. A sub service delay 242 yields one of two results. If the service level average is good 243 then bottleneck warning is ignored. If the delay is abnormal for the subservice, then an alert is issued for the subservice.

Figure 3:
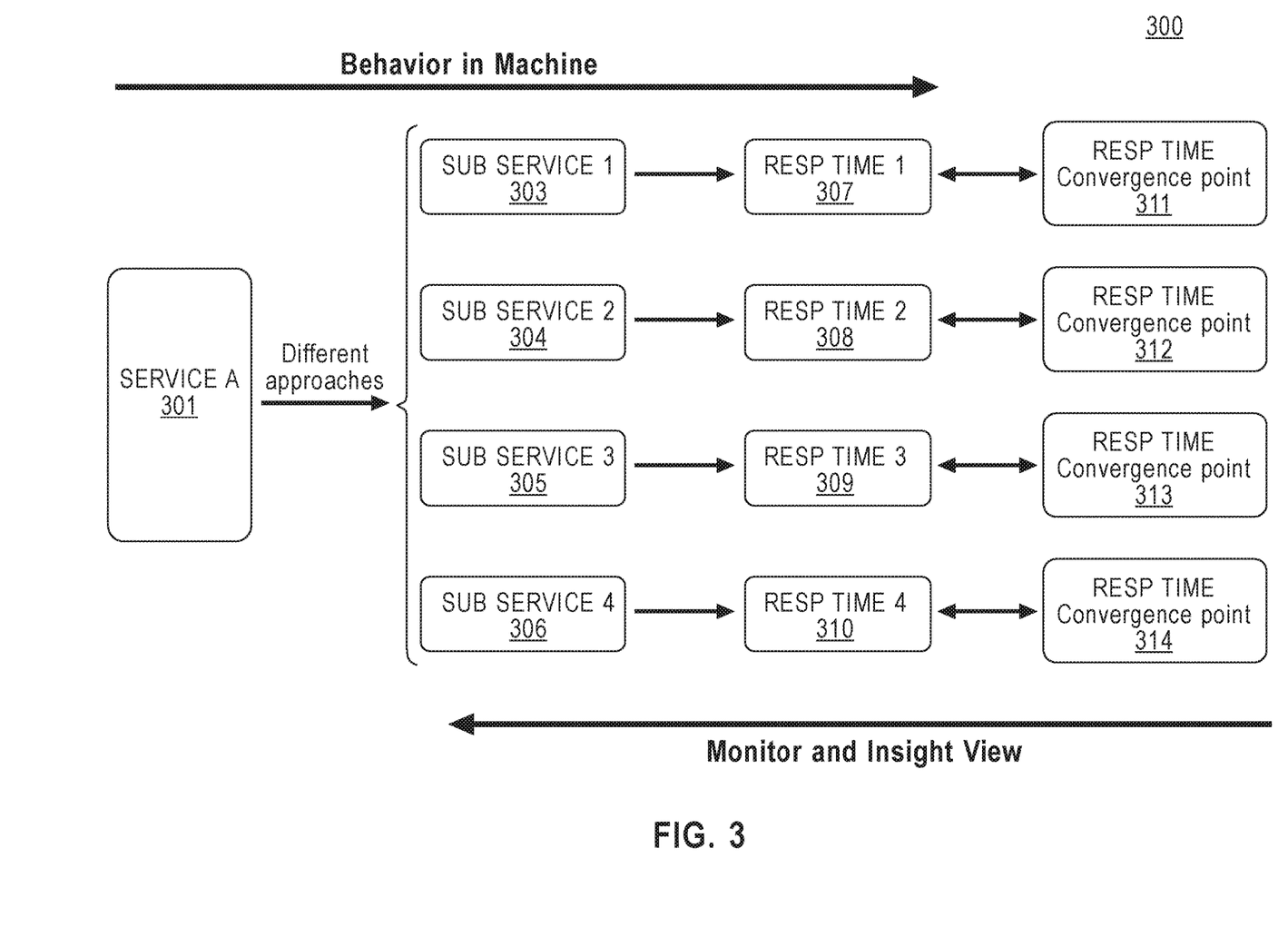
FIG. 3 illustrates a methodology of a process for enhanced bottleneck analysis in an early stage in a microservice system in accordance with one or more embodiments of the present invention.

Referring to FIG. 3, a further methodology 300 is generally shown in accordance with one or more embodiments of the present invention. The methodology looks at both the behavior within a machine and a monitor and insight view in a microservice system. A microservice (service A) 301 is divided into different subservices (subservice 1, 303), (subservice 2, 304), (subservice 3, 305), and (subservice 4, 306). An aspect of the one embodiment of the present invention determines response times for each of the subservices (resp time 1, 307), (resp time 2, 308), (resp time 3, 309), and (resp time 4, 310). The methodology 300 further develops response time convergence points as shown in blocks 311, 312, 313 and 314. It is the above methodologies which allows embodiments of the present invention to identify and report bottleneck at an early stage in a microservice system. The methodologies conducts response time analysis, uses a history data stream for each microservice, determines different convergence points of the response time, and analysis the current monitored data stream to identify bottlenecks by the decision system. The above methodologies allows embodiments of the present invention to generate rules of providing the suggested alert about the potential bottlenecks and doing joint analyzing different performance indicators to identify any anomaly.

Figure 4:
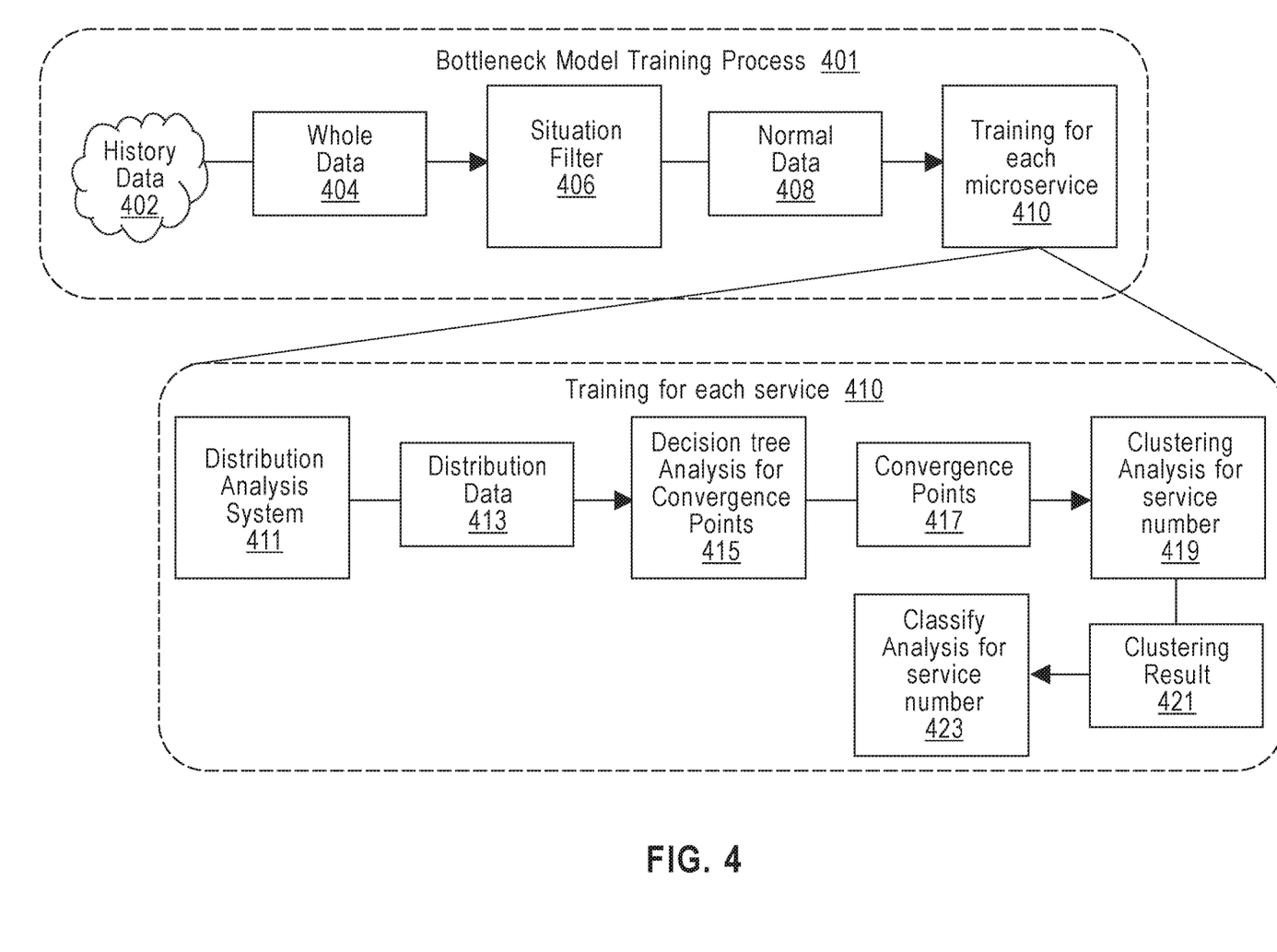
FIG. 4 illustrates a bottleneck model training process for enhanced bottleneck analysis in an early stage in a microservice system in accordance with one or more embodiments of the present invention.

Now turning to FIG. 4, a bottleneck model training process for enhanced bottleneck analysis in early stage in microservice in accordance with one or more embodiments of the present invention will be described. Bottleneck model training process 401 is used for building the bottleneck indicator model 110 by doing analysis of the historical data 402 and supplying whole data 404. For each microservice service, a situation filter 406 filters out some data by using a current situation setting. Once filtered, normal data 408 is used for training each microservice 410 within the bottleneck indicator model 110. The training for each microservice 410 block includes a distribution analysis system 411 which conducts a distribution analysis of the normal data 408. The distribution analysis system 411 generates distribution data 413. The distribution data 413 is feed into a decision tree analysis for generating convergence points as representative by block 415. The convergence points 417 are feed into a clustering analysis system for each service number as representative by block 419. The clustering analysis system 419 is supplied a clustering result 421. The clustering result 421 is then supplied to classify analysis for the service number, as representative by block 423. All is this training is supplied back to the bottleneck indicator model 110.

Figure 5:
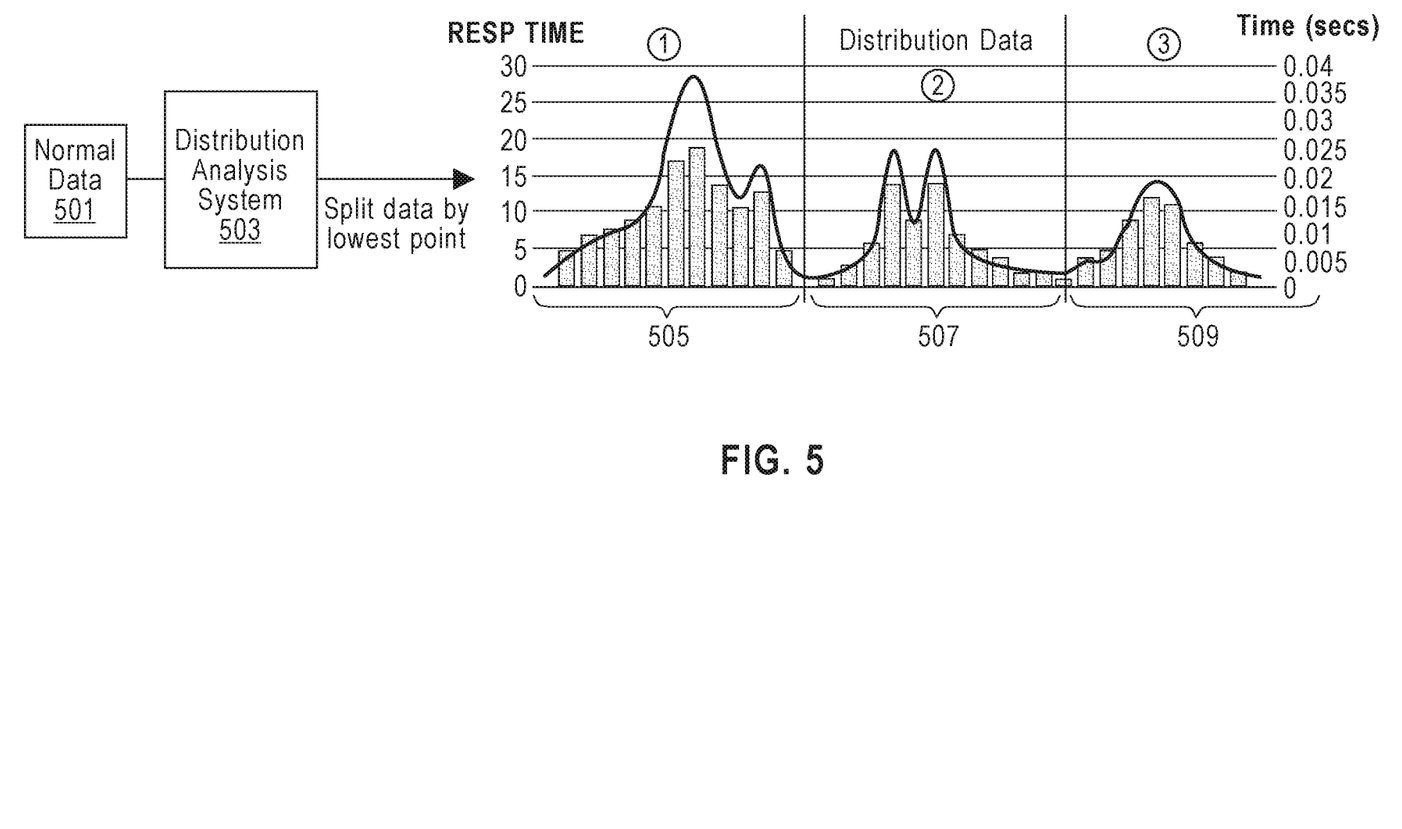
FIG. 5 illustrates convergence point analysis for enhanced bottleneck analysis in an early stage in a microservice system in accordance with one or more embodiments of the present invention.

Now turning to FIG. 5, convergence point analysis for enhanced bottleneck analysis in early stage in a microservice in accordance with one or more embodiments of the present invention is described in greater detail. After filtering some data, the remaining normal data 501 is sent to a distribution analysis system 503. The distribution analysis system 503 first needs to decide the interval of the data. Then the distribution analysis system 503 draws the histograms 505, 507, and 509 to get the distribution data needed for the decision tree analysis system 415.

Figure 6:
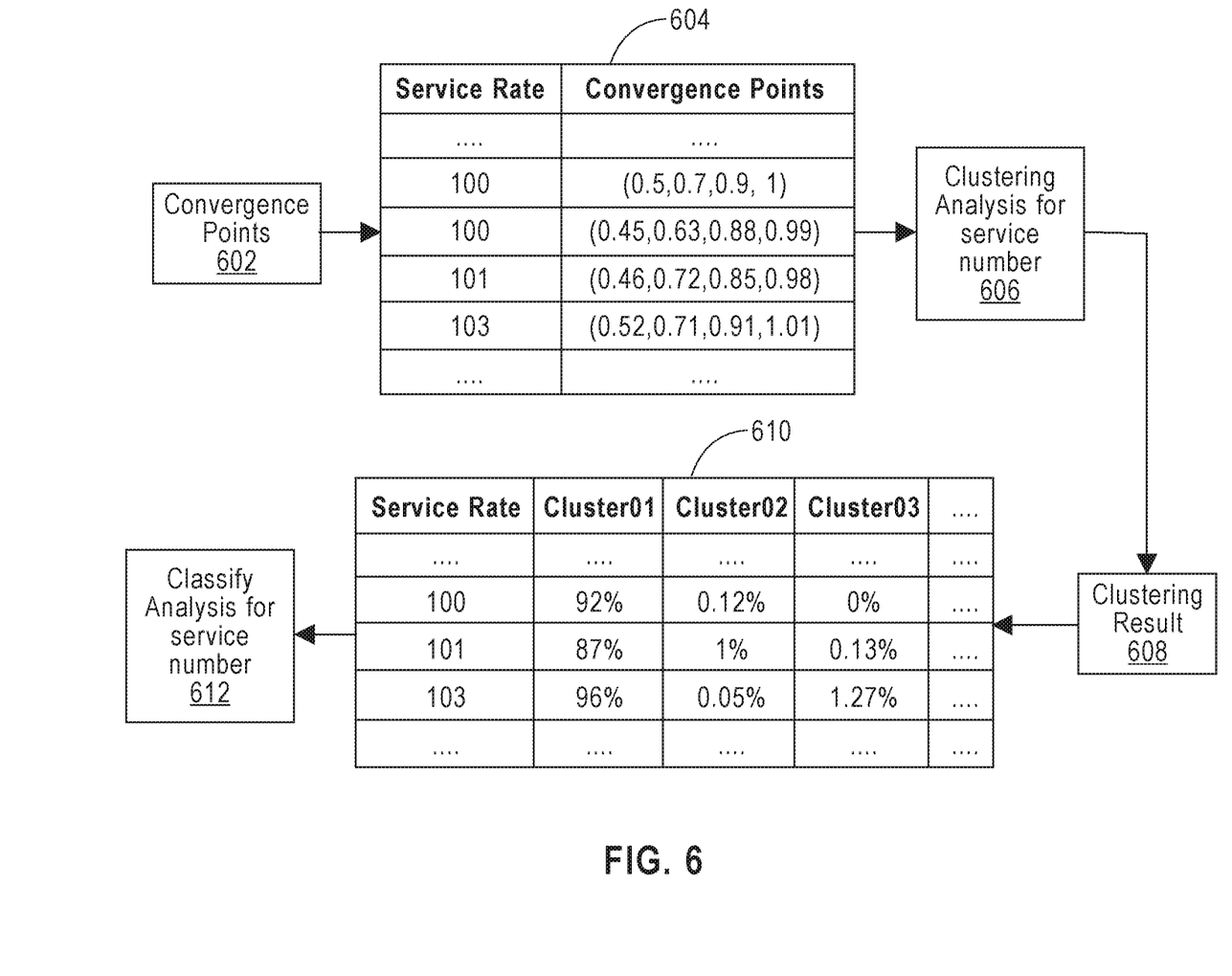
FIG. 6 illustrates a bottleneck model training process for enhanced bottleneck analysis in an early stage in a microservice system in accordance with one or more embodiments of the present invention.

Now turning to FIG. 6, a bottleneck model training process for enhanced bottleneck analysis in early stage in a microservice in accordance with one or more embodiments of the present invention is described in further detail. Using convergence points 602, a pretreatment processing convenient table 604 is developed. The data in the table 604 is split into two parts, service rate and convergence points. The data from table 604 is supplied to the clustering analysis system 606 for a service number. The output of the clustering analysis system 606 is the clustering result 608. The clustering result 608 is spilt into a service and cluster data table 610. The service and cluster data table 610 supplies this information to the classify analysis for the service number as representative by block 612.

Figure 7A:
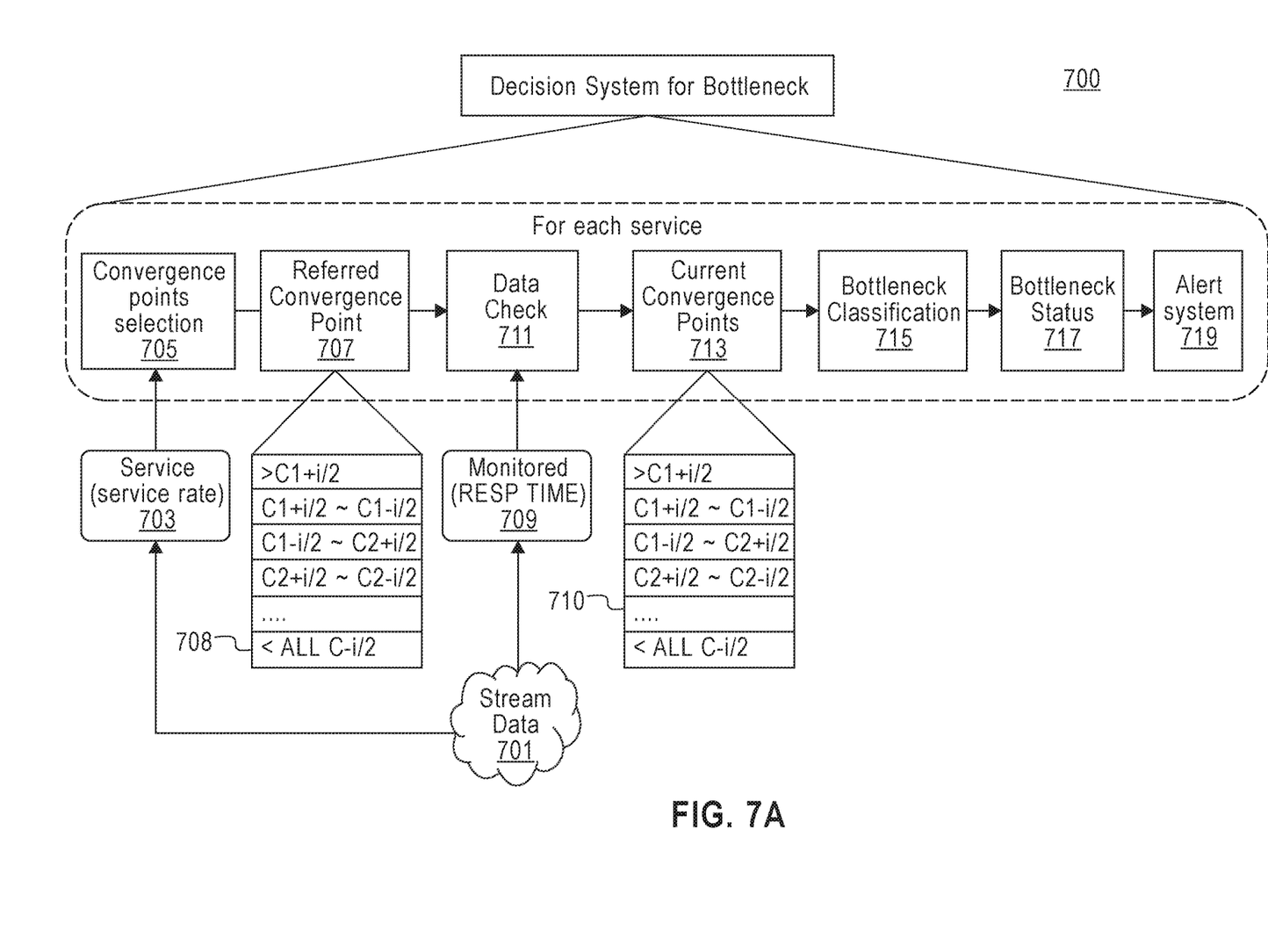
FIG. 7A illustrates a decision system process for enhanced bottleneck analysis in an early stage in a microservice system in accordance with one or more embodiments of the present invention.

Referring to FIG. 7A, a decision system 700 for enhanced bottleneck analysis in early stage in a microservice in accordance with one or more embodiments of the present invention comprises a plurality processes for each service. The decision system 700 uses a convergence points selection process 705 based upon the data stream 701 and a service rate 703. A referred convergence point 707 uses a base convergence table 708. A data check 711 uses the stream data 701, a monitored response time 709, the output of referred convergence point 707 and the selection process 705. The output of the data check 711 serves as the input base for detecting current convergence points as referenced by block 713 which uses a current convergence table 710. The output of block 713 is supplied to a bottleneck classification 715. As a result of the bottleneck classification 715, a bottleneck status can be determined as referenced by block 717. If the bottleneck status warrants an alert, the alert system 719 will issue the alert.

Figure 7B:
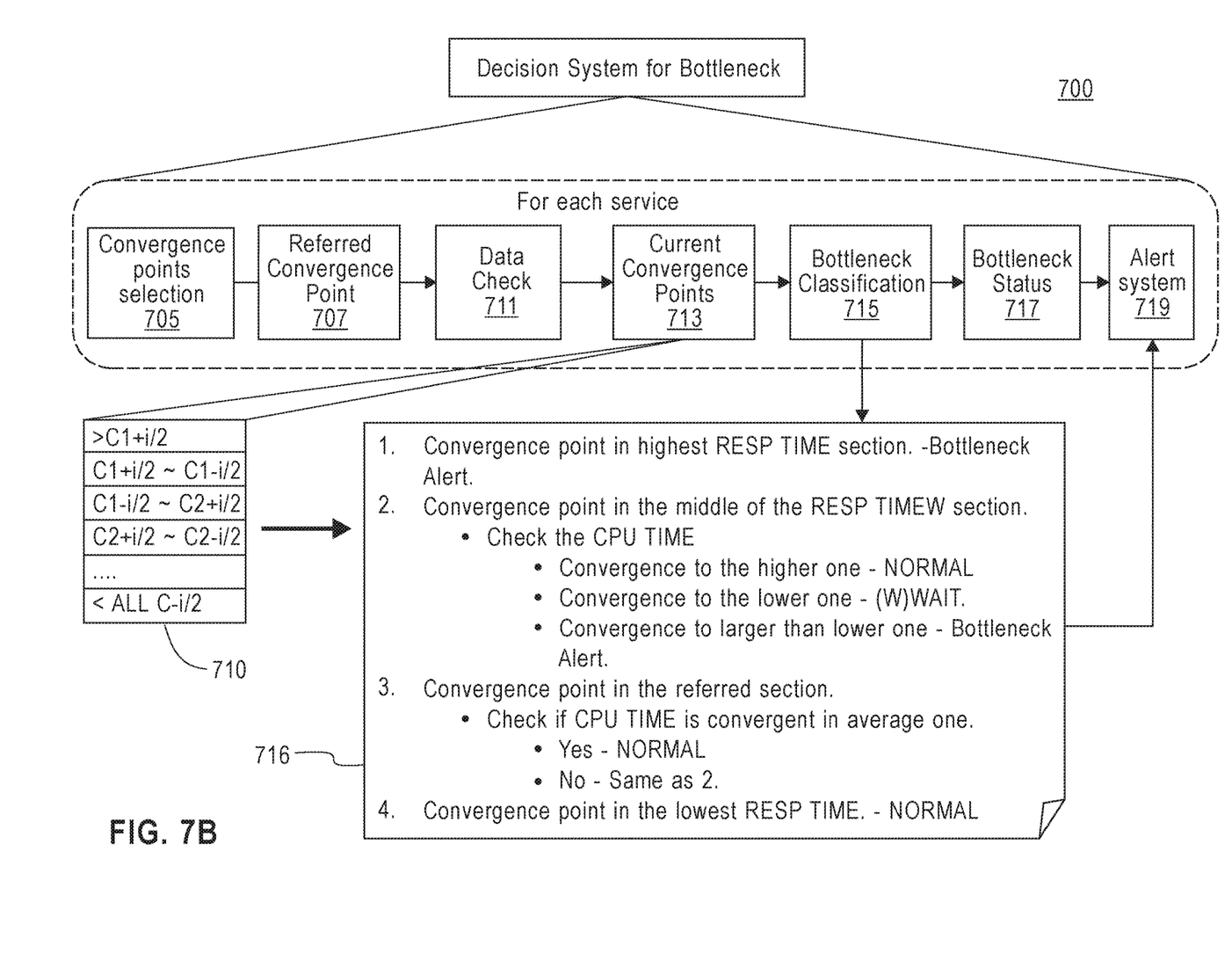
FIG. 7B illustrates a decision system process for enhanced bottleneck analysis in an early stage in a microservice system in accordance with one or more embodiments of the present invention.

Referring to FIG. 7B, the decision system 700 for enhanced bottleneck analysis in early stage in a microservice in accordance with one or more embodiments of the present invention comprises a plurality processes for each service. The decision system 700 uses a convergence points selection process 705 based upon the data stream 701 and a service rate 703. A referred convergence point 707 uses a base convergence table 708. A data check 711 uses the stream data 701, a monitored response time 709, the output of referred convergence point 707 and the selection process 705. The output of the data check 711 serves as the input base for detecting current convergence points as referenced by block 713 which uses a current convergence table 710. The output of block 713 is supplied to a bottleneck classification 715. As a result of the bottleneck classification 715, a bottleneck status can be determined as referenced by block 717. The alert system 719 uses the output of block 717 and a reference value as defined by a classification table 716. If the bottleneck status warrants an alert, the alert system 719 will issue the alert to a user.

Figure 8:
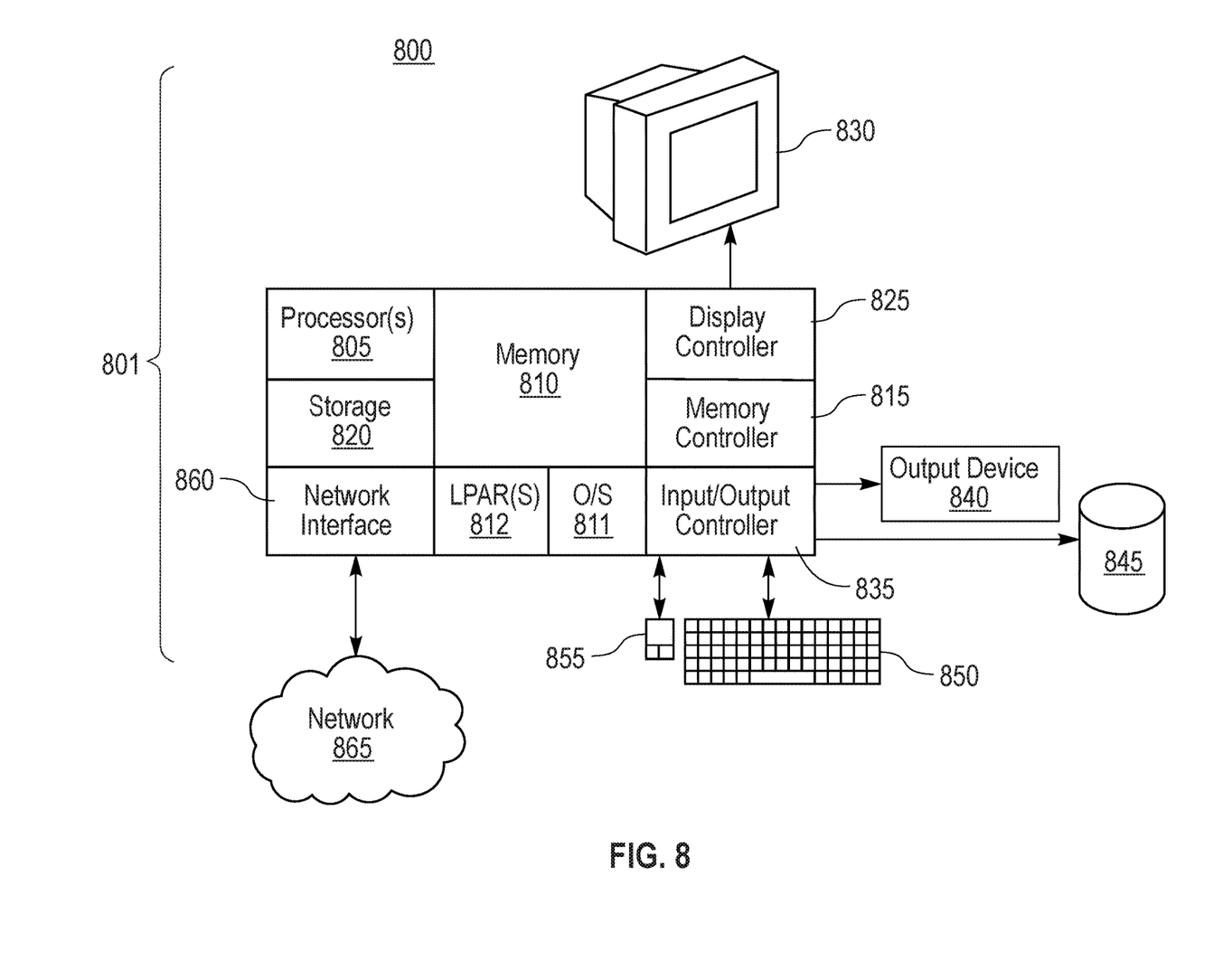
FIG. 8 illustrates a computer system for enhanced bottleneck analysis in an early stage in a microservice system in accordance with one or more embodiments of the present invention.

Turning now to FIG. 8, a computer system 800 for determining data placement on storage devices is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 800 therefore may include general-purpose computer or mainframe 801 capable of running multiple instances of an O/S simultaneously.

In an exemplary embodiment, in terms of hardware architecture, as shown in FIG. 8, the computer 801 includes one or more processors 805, memory 810 coupled to a memory controller 815, and one or more input and/or output (I/O) devices 840, 845 (or peripherals) that are communicatively coupled via a local input/output controller 835. The input/output controller 835 can be, for example but not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 835 may include a plurality of sub-channels configured to access the output devices 880 and 845. The sub-channels may include fiber-optic communications ports.

The processor 805 is a hardware device for executing software, particularly that stored in storage 820, such as cache storage, or memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing instructions.

The memory 810 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The instructions in memory 810 may include one or more separate programs, each of which comprises an ordered listing of executable instructions for implementing logical functions. In the example of FIG. 8, the instructions in the memory 810 a suitable operating system (OS) 811. The operating system 811 essentially controls the execution of other computer programs and provides scheduling, input-output control, file and data management, memory management, and communication control and related services.

The memory 810 may include multiple logical partitions (LPARs) 812, each running an instance of an operating system. The LPARs 812 may be managed by a hypervisor, which may be a program stored in memory 810 and executed by the processor 805.

In an exemplary embodiment, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In an exemplary embodiment, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In an exemplary embodiment, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the instructions in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute instructions stored within the memory 810, to communicate data to and from the memory 810, and to generally control operations of the computer 801 pursuant to the instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of training a bottleneck indicator model, the method comprising:

executing, via a processor, a bottleneck model training process for microservices in a microservice system, wherein for each of the microservices the bottleneck model training process filters out a subset of training data based at least in part on a current situation setting;

building, via the processor, the bottleneck indicator model for each of the microservices using information from the bottleneck model training process, the bottleneck indicator model comprising convergence points for an expected response time, wherein the training data includes historical data, wherein training using the bottleneck model training process conducts analysis of the historical data to provide training associated with each of the microservices thereby resulting in the bottleneck indicator model that has been trained, wherein training data is created by filtering the historical data based at least in part on a setting in which a response time for a microservice that is greater than the expected response time, wherein the bottleneck indicator model includes a decision tree analysis algorithm configured to generate convergence points using the training data;

monitoring, via the processor, a data stream according to the bottleneck indicator model, the bottleneck indicator model using the convergence points for response times; and generating, via the processor, system alerts to a user when a bottleneck is identified using a bottleneck identification process, based on monitoring performed according to the bottleneck indicator model.

2. The computer-implemented method according to claim 1, wherein the bottleneck indicator model uses clustering to find the convergence points for the response times with different service rate.

3. The computer-implemented method according to claim 2, wherein the bottleneck indicator model further uses distribution analysis to find the convergence points for the response times with the different service rate.

4. The computer-implemented method according to claim 1, wherein the bottleneck identification process includes a decision system that compares the data stream with a reference value.

5. The computer-implemented method according to claim 4, wherein the decision system provides a system alert.

6. The computer-implemented method according to claim 5, wherein the system alerts are within the financial services industry.

7. A system of training a bottleneck indicator model, the system comprising:

a memory having computer readable instructions; and one or more processors for executing the computer readable instructions, the computer readable instructions controlling the one or more processors to perform operations comprising:

executing a bottleneck model training process for microservices in a microservice system, wherein for each of the microservices the bottleneck model training process filters out a subset of training data based at least in part on a current situation setting;

building the bottleneck indicator model for each of the microservices using information from the bottleneck model training process, the bottleneck indicator model comprising convergence points for an expected response time, wherein the training data includes historical data, wherein training using the bottleneck model training process conducts analysis of the historical data to provide training associated with each of the microservices thereby resulting in the bottleneck indicator model that has been trained, wherein training data is created by filtering the historical data based at least in part on a current situation setting in which a response time for a microservice that is greater than the expected response time, wherein the bottleneck indicator model includes a decision tree analysis algorithm configured to generate convergence points using the training data;

monitoring a data stream according to the bottleneck indicator model, the bottleneck indicator model using the convergence points for response times; and generating system alerts to a user when a bottleneck is identified using a bottleneck identification process, based on monitoring performed according to the bottleneck indicator model.

8. The system according to claim 7, wherein the training data includes historical data and the bottleneck model training process conducts analysis of the historical data.

9. The system according to claim 7, wherein the bottleneck indicator model uses clustering to find the convergence points for the response times with different service rate.

10. The system according to claim 9, wherein the bottleneck indicator model further uses distribution analysis to find the convergence points for the response times with the different service rate.

11. The system according to claim 7, wherein the bottleneck identification process includes a decision system that compares the data stream with a reference value.

12. The system according to claim 7, wherein the decision system provides a system alert.

13. The system according to claim 12, wherein the system alerts to notify a user is within the financial services industry.

14. A computer program product comprising a computer readable storage medium having program instructions embodied therewith, the program instructions of training a bottleneck indicator model executable by a processor to cause the processor to perform operations comprising:

executing a bottleneck model training process for microservices in a microservice system, wherein for each of the microservices the bottleneck model training process filters out a subset of training data based at least in part on a current situation setting;

building the bottleneck indicator model for each of the microservices using information from the bottleneck model training process, the bottleneck indicator model comprising convergence points for an expected response time, wherein the training data includes historical data, wherein training using the bottleneck model training process conducts analysis of the historical data to provide training associated with each of the microservices thereby resulting in the bottleneck indicator model that has been trained, wherein training data is created by filtering the historical data based at least in part on a current situation setting in which a response time for a microservice that is greater than the expected response time, wherein the bottleneck indicator model includes a decision tree analysis algorithm configured to generate convergence points using the training data;

monitoring, via the processor, a data stream according to the bottleneck indicator model, the bottleneck indicator model using the convergence points for response times; and generating system alerts to a user when a bottleneck is identified using a bottleneck identification process, based on monitoring performed according to the bottleneck indicator model which uses the convergence points for response times.

15. The computer program product according to claim 14, wherein the training data includes historical data and the bottleneck model training process conducts analysis of the historical data.

16. The computer program product according to claim 14, wherein the bottleneck indicator model uses clustering to find the convergence points for the response times with different service rate.

17. The computer program product according to claim 16, wherein the bottleneck indicator model further uses distribution analysis to find the convergence points for the response times with the different service rate.

18. The computer program product according to claim 14, wherein the bottleneck identification process includes a decision system that compares the data stream with a reference value.

19. The computer program product according to claim 14, wherein the decision system provides a system alert.

* * * * *